United States Patent [19]

Guillemin

[11] Patent Number: 4,577,836
[45] Date of Patent: Mar. 25, 1986

[54] FLAP FOR A HEATER OR AIR CONDITIONER INSTALLATION FOR A MOTOR VEHICLE CABIN

[75] Inventor: Jean Guillemin, Elancourt, France
[73] Assignee: VALEO, Paris, France
[21] Appl. No.: 620,739
[22] Filed: Jun. 14, 1984
[30] Foreign Application Priority Data Jun. 14, 1983 [FR] France .................................. 83 09834

[51] Int. Cl.$^4$ ............................................. F16K 51/00
[52] U.S. Cl. .......................................... 251/356; 98/2; 137/897; 251/298
[58] Field of Search ..................... 98/2, 38.6; 137/896, 137/897; 251/298, 356

[56] References Cited

U.S. PATENT DOCUMENTS 3,211,177 10/1965 Phillips et al. ...................... 137/896
3,241,568 3/1966 Mayo, Jr. ......................... 251/298 X
3,557,830 1/1971 Raw .................................. 137/896

Primary Examiner—Harold Joyce
Attorney, Agent, or Firm—Dennison, Meserole, Pollack & Scheiner

[57] ABSTRACT

A flap for a ventilator, heater, or air conditioner installation in particular for the cabin of a motor vehicle, comprises a support plate (12) and at least one block-shaped air-guiding blade (20) mounted on said plate. Said block-shaped blade is constituted by at least two thin walls (22, 24) of plastics material which are made on and fixed to said support plate by molding. At least one of said walls is folded back and fixed to the other wall to obtain a a block-shaped blade having a volume which is greater than the sum of the volumes of said thin walls. This avoids the need to add on a plastic or foam block separately.

11 Claims, 4 Drawing Figures

FLAP FOR A HEATER OR AIR CONDITIONER INSTALLATION FOR A MOTOR VEHICLE CABIN

The invention relates to a flap for a ventilator, heater, or air conditioner installation, in particular for the cabin of a motor vehicle, and intended for pivotal mounting in a duct or conduit in the installation to adjust the mixing of a flow of cold air and a flow of hot air, and thus adjust the temperature of the air admitted to the cabin.

BACKGROUND OF THE INVENTION

It has been observed that, in order to ensure that the mixture of hot air and cold air is homogeneous, such a flap needs to be fitted with air-guiding blades, and that at least one of the blades should be in the form of a block occupying a certain volume rather than being a mere partition or thin wall added to or integrally molded with the flap.

Present practice is to make such a blade as a solid block of plastic or as a block of foam, and to glue the block to the flap. This technique is relatively expensive since it requires a separate mold to be provided for fabricating the block-shaped blade, and then an additional manufacturing step of fixing the block to the flap.

Preferred embodiments of the present invention avoid this drawback.

SUMMARY OF THE INVENTION

The present invention provides a flap for a ventilator, heater, or air conditioner installation, in particular for the cabin of a motor vehicle, the flap comprising a support plate and at least one air-guiding blade mounted on said plate, the improvement wherein said blade is constituted by at least two thin walls of substantially rigid plastics material which are made on and fixed to said support plate by molding, with at least one of said walls being folded back and fixed to the other wall to obtain a blade having a volume which is greater than the sum of the volumes of said thin walls.

Thus in accordance with the invention, the block-shaped blade which occupies a certain volume is made simply by molding thin walls of plastics material directly onto the support plate, and advantageously at the same time as the other blades comprising thin walls extending perpendicularly to the support plate are molded thereon. The wall which is folded back and fixed to the said other wall builds up a "block" blade of the desired shape and volume.

The said folded-back wall may be resiliently snap-fitted to the said other wall. Such fixing is simple and cheap.

In a variant embodiment, the said folded-back wall includes a first portion and a second portion which are interconnected by a flexible hinge, the first portion being folded back relative to the support plate and being fixed to the said other wall, and the second portion being folded relative to the first portion and being also fixed to the second wall, in such a manner as to obtain a blade in the form of a closed block.

This variant thus obtains the same result and the same shape as adding on a solid block or a foam block to the support plate, eg. by gluing.

BRIEF DESCRIPTION OF THE DRAWINGS

Embodiments of the invention are described by way of example with reference to the accompanying drawings, in which.

MORE DETAILED DESCRIPTION

Figure 1:
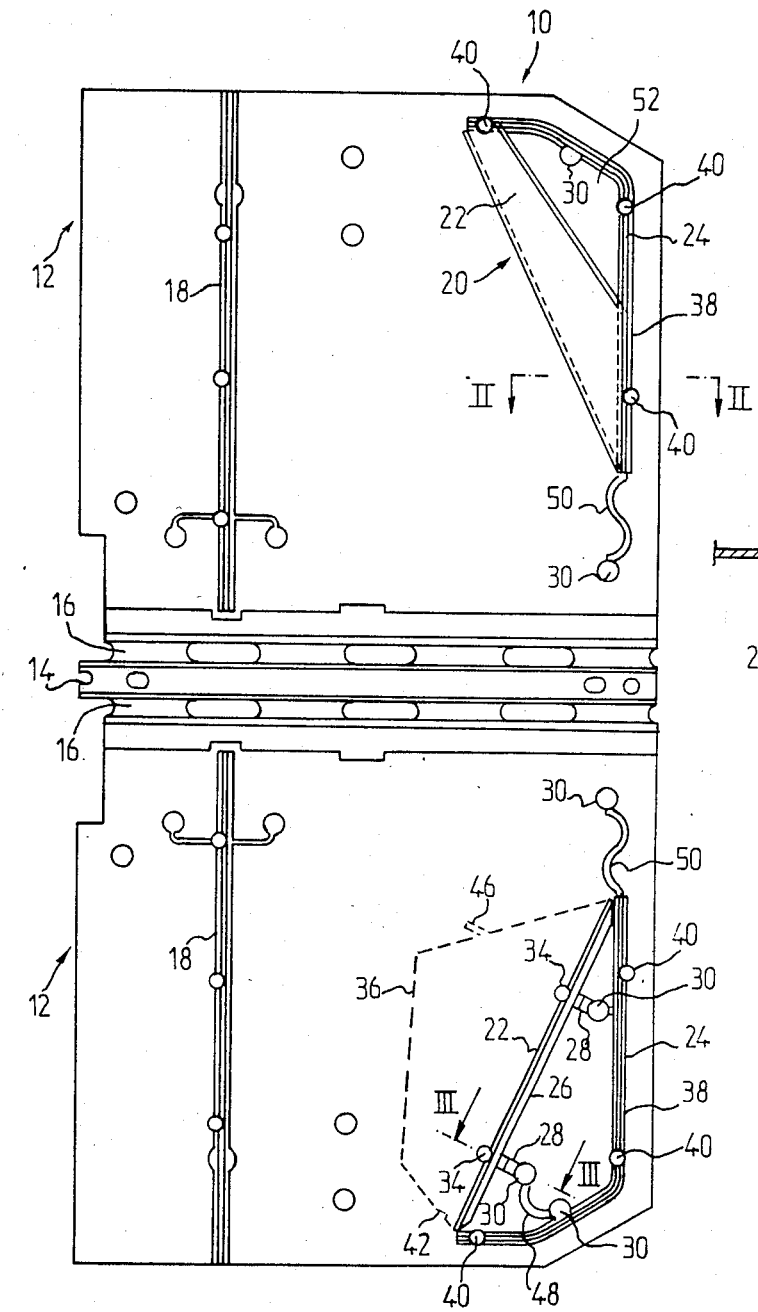
FIG. 1 is a plan view of one embodiment of a flap in accordance with the invention.
Figure 2:
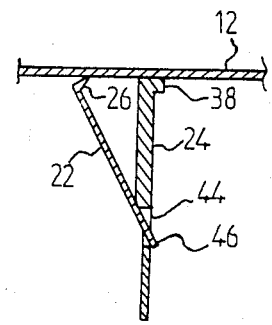
FIG. 2 is a view of part of the flap in section on line II—II of FIG. 1.
Figure 3:
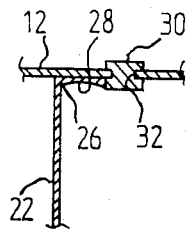
FIG. 3 is a view of part of the flap in section on line III—III of FIG. 1.

Reference is made initially to FIGS. 1, 2, and 3 which show a first embodiment of the invention.

The flap 10 shown in FIG. 1 is a two-part flap comprising two support-plates 12 which are symmetrical to each other about a central potin 14, and each of which is connected to the central portion by a flexible hinge 16 made of plastics material.

In this embodiment, the support plates 12 are made of metal, e.g. aluminum, and the flexible hinges 16 are molded onto the plates.

Each plate 12 has a first transverse blade 18 which extends perpendicularly to the support plate and which is constituted by a partition or thin, plane wall which is made by molding plastics material onto the plate 12. In addition to the plane blade 18, each plate 12 has a blade 20 which is approximately shaped like a truncated tetrahedron. This blade comprises two thin walls 22 and 24 respectively which are made and fixed in place by molding a fairly rigid plastics material to the plate. In the top half of FIG. 1 the blade 20 is shown in its final form, i.e. after the wall 22 has been folded back and fixed to the wall 24. In the bottom half of FIG. 1, the blade 20 is shown before the wall 22 has been folded, i.e. both walls 22 and 24 are shown as they are obtained from the molding operation.

The wall 22 is a thin plane wall which, after molding is over, is perpendicular to the plate 12 and has an elongate bottom rim 26 extending flat along the plate. The rim 26 is connected by flexible plastics material hinges 28 to fixing and anchoring tabs 30 on the plate 12. To this end this plate has holes 32 (see FIG. 3) which are filled with injected plastics material that forms an extra thickness on either side of the plate 12 to constitute the anchor tabs. These tabs 30 also correspond to the points where the plastic material is injected during molding.

The wall 22 may also have projections 34 which provide bearing points for ejector means used during unmolding.

A dashed line in the bottom half of FIG. 1 shows the geometrical projection 36 of the wall 22 on the plate 12.

The other wall 24 extends perpendicularly to the plate 12 and is substantially L-shaped or J-shaped and has a thickened bottom rim 38 via which it is substantially sealed to the support plate 12. The wall 22 extends from one end to the other of the wall 24.

The wall 24 also has ejection projections 40, one of which is suitable for co-operating with a cut-out 42 in the free edge of the wall 22, thus enabling the wall 22 to be fixed and hooked to the wall 24.

The wall 24 also includes an orifice 44 (see FIG. 2) for receiving a finger or lug 46 on a free edge of the wall 22.

Advantageously, the walls 22 and 24 are molded simultaneously onto the support plate 12 and at the same time as the partition 18, by injecting plastics material at the points 30 which are four in number in the example shown. Two of these injection points 30 are interconnected by a filler 48 of plastics material, and another of the injection points 30 is connected to the wall 24 by a fillet 50 of plastics material. The fillets 48 and 50 serve to compensate for shrinkage of the plastics material as it cools.

To assemble the blade 20 as shown in the top half of FIG. 1, all that is necessary is to fold back the wall 22 towards the wall 24 while pushing the cutout 42 in the wall 22 onto the corresponding projection 40 of the wall 24, thereby jamming the free edge of the wall 22 under the projection 40 resiliently and thus inserting the finger or lug 46 of the wall 22 into the hole or orifice 44 in the wall 24. When it is folded back, the wall 22 passes from a position in which it is perpendicular to the support plate 12 to a position in which it is at an oblique angle thereto, thereby causing its bottom rim 26 to pivot about the two flexible hinges 28 so that the rim 26 extends obliquely to the support plate 12 as shown in FIG. 2, and is pressed in a substantially airtight manner thereagainst.

When the wall 22 has been folded back and fixed to the wall 24 in this manner, there remains an open zone at the top of the blade 20 which is referenced 52 in the top half of FIG. 1. Tests have nevertheless shown that the presence of this zone which is open or at least is not closed does not have any noticeable influence on the operation of the flap.

Figure 4:
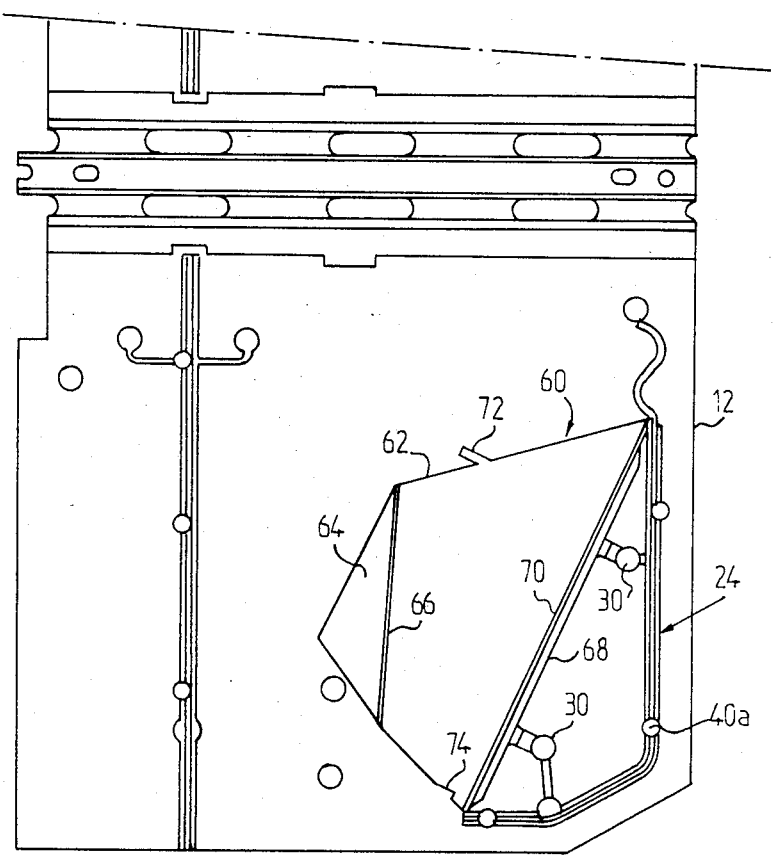
FIG. 4 is a view of part of a flap including a second embodiment of a blade in accordance with the invention.

The variant shown in FIG. 4 enables a completely closed blade to be obtained.

In this variant, as in the embodiment shown in FIGS. 1 to 3, the blade comprises an L-shaped or J-shaped wall 24 extending perpendicularly to the support plate 12 and in the form of plastics material molded onto the plate. The other wall 60 of the blade is molded flat onto the support plate 12 and comprises a first portion 62 having the same shape as the wall 22 in the embodiment shown in FIGS. 1 to 3, and a second portion 64 whose shape matches the open zone 52 of the blade 20 in FIG. 1. The two portions 62 and 64 of the wall 20 are connected to one another by a flexible hinge 66 of plastics material constituted by a thin region in the wall 60, and the first portion 62 is connected to the rim 68 which corresponds to the rim 26 shown in FIG. 1 by means of a flexible hinge 70 of plastics material.

Like the wall 22, the first portion 62 of the wall 60 has a finger or lug 72 and a cutout 74 for fixing to the wall 24.

The blade is obtained by pivoting the wall assembly 60 about the flexible hinge 70, fixing the first portion 62 to the partition 24 by means of the finger or lug 72 and the cutout 74, and then pivoting the second portion 64 about the flexible hinge 66 and fixing the second portion 64 to the partition 24. The second portion 64 may be fixed by a snap fit under the projection 40a on the wall 24, or by any other suitable means.

In this variant embodiment, the flexible hinge 70 enables the rim 68 of the partition 60 to remain pressed flat against the support plate 12 when the partition 60 is folded back.

I claim:

1. In a flap for an air flow installation, in particular for the cabin of a motor vehicle, said flap comprising a support plate and at least one air-guiding blade mounted on said plate; the improvement wherein said blade comprises at least two thin walls of substantially rigid plastics material molded to said support plate and projecting laterally therefrom in generally spaced relation to each other, at least one of said walls being folded toward and fixed to the other wall outward of said support plate to define a blade on said plate having a volume which is greater than the sum of the volumes of said thin walls.

2. A flap according to claim 1, incuding means resiliently snap-fitting the folded wall to the said other wall.

3. A flap according to claim 1, wherein the folded wall includes a rim thereon extending along said support plate which rim is resiliently pressed against the plate in a substantially airtight manner with said wall folded toward said other wall.

4. A flap according to claim 3, including holes defined through said support plate adjacent the folded wall, anchor tabs in said holes, and flexible hinges engaged between and fixing said rim to said anchor tabs on the support plate, said tabs comprising plastics material which is injected into holes in the support plate.

5. A flap according to claim 1, wherein the said folded wall includes a free edge remote from said support plate, and a finger located on and projecting from said free edge, and an orifice defined in the said other wall remote from said support plate for receiving said finger and fixing said walls together.

6. A flap according to claim 1, wherein said folded wall includes a free edge with a cutout defined therein, said other wall including a cylindrical projection thereon received within said cutout for a resilient retention of said folded wall to said other wall.

7. A flap according to claim 1, wherein the said folded wall includes a first portion and a second portion interconnected by a flexible hinge, said first portion being folded relative to the support plate and being fixed to said other wall, and said second portion being folded relative to the first portion and being fixed to said other wall, defining a blade on said support plate in the form of a closed block.

8. A flap according to claim 7, wherein said first portion of the folded wall includes a rim which extends flat against the support plate and a flexible hinge connecting the first portion to said rim.

9. A flap according to claim 1, wherein the said other wall extends perpendicularly to the support plate and is L-shaped or J-shaped.

10. A flap according to claim 1, wherein, prior to being folded, said one of said walls extends perpendicularly to the support plate and is planar.

11. A flap according to claim 7 or 8, wherein said one of said walls is molded flat on the support plate.

* * * * *